Oct. 14, 1930.  W. E. DOUGHTY  1,778,248
PORTABLE DISPENSING APPARATUS
Filed Dec. 5, 1927
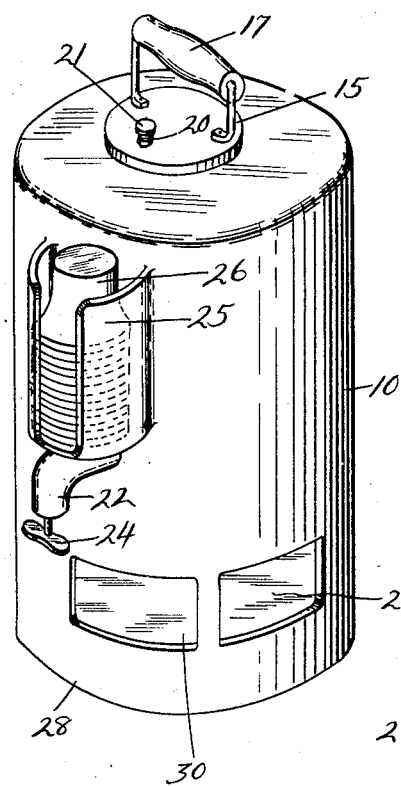
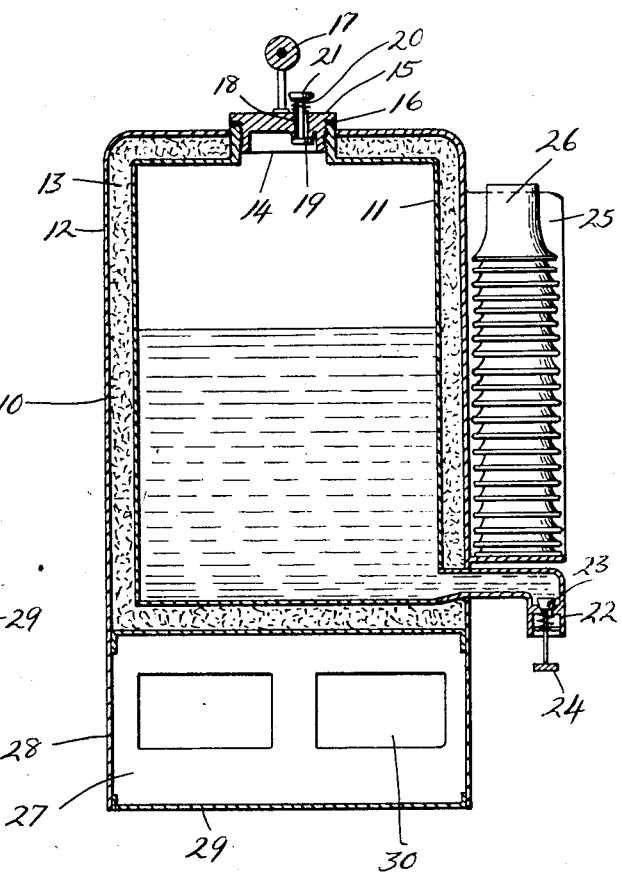
Inventor
William E. Doughty
By Whittemore Hulbert Whittemore Belknap
Attorneys Patented Oct. 14, 1930

1,778,248

UNITED STATES PATENT OFFICE

WILLIAM E. DOUGHTY, OF DETROIT, MICHIGAN, ASSIGNOR TO JAMES VERNOR COMPANY, OF DETROIT, MICHIGAN, A CORPORATION OF MICHIGAN

PORTABLE DISPENSING APPARATUS

Application filed December 5, 1927. Serial No. 237,850.

This invention relates to beverage dispensing apparatus and more particularly to self-contained units or devices of this character of a portable nature.

While from the nature of the apparatus about to be described it will be apparent that the same may be used to dispense various kinds of liquid the invention finds particular utility in dispensing carbonated beverages such as ginger ale and the like. In many places such as baseball parks, stadiums and the like the distribution of beverages in the bottle is prohibited and it is necessary for the dispenser to either carry the beverages being sold in bottles and to empty each bottle as it is sold into a paper cup or other container or to carry the beverage from the source of supply to the customers in paper cups or other containers by means of trays or racks. The latter practice is objectionable for several reasons, particularly when the beverage being sold or dispensed is ginger ale or some other carbonated beverage. In the first place, it is difficult to maintain the beverage at the proper temperature; in the second place this manner of dispensing beverages is at best unsanitary and lastly; carbonated beverages when left in open containers become flat and unpalatable. While the dispensing of carbonated beverages in bottles is much more satisfactory and sanitary than this other method it has been found that the manufacture and sale of beverages of this character in the bulk without the use of bottles is more economical because the cost of bottles and bottling is eliminated and more satisfactory otherwise because draft ginger ale is found to be more palatable.

It is therefore one of the primary objects of this invention to provide a portable apparatus particularly adapted for dispensing draft ginger ale or other carbonated beverages and to this end the invention comprises a substantially air tight heat insulated beverage container provided with a filling opening through which the container may be filled from the main source of supply of properly chilled beverage. The container is provided with a handle by means of which the same may be carried and with a cup rack wherein a supply of paper drinking cups or the like is contained. The container is also provided with a discharge faucet or spout and with a compartment under the container wherein the used cups may be placed. It has been found that with such a device properly chilled ginger ale or other beverage may be maintained at the proper temperature for a period of several hours during which time the contents of the container is ordinarily fully disposed of. The cups in which the beverage is sold are conveniently located and with a compartment for disposing of the used cups a complete portable unit is provided by means of which the carbonated beverage may be carried in an entirely satisfactory condition and may be dispensed to and among the customers seated throughout the baseball park, stadium or the like.

The novel details of construction of my improved portable dispensing apparatus will be made more apparent as this description proceeds, especially when considered in connection with the accompanying drawings wherein:

Figure 1 is a perspective view of a dispensing apparatus constructed in accordance with my invention, and Figure 2 is a vertical sectional view through the apparatus.

Referring now particularly to the drawings wherein like reference characters indicate like parts it will be noted that there is illustrated a beverage container indicated generally by the reference character 10 which consists of an inner container or chamber 11 and an outer container or chamber 12, the space between the two containers being filled with a heat insulating material 13. The upper end of the beverage container is provided with a filling opening 14 the wall of which is threaded for engagement by a closure cap 15 which may be provided with a gasket or the like 16 so as to provide an air tight connection between the closure cap and container. Secured to the cap is a handle 17 by means of which the cap 15 may be screwed into place or removed and also by means of which the container may be carried. Located in the closure cap 15 is an air inlet 18 normally closed by means of a valve 19 urged into closed position by means of a spring 20. A button or thumb piece 21 on the end of the valve stem provides means for opening the valve against the action of spring 20. Communicating with the lower end of the beverage container is an outlet spout or faucet 22 provided with a valve 23 of any desired or approved design operable by the engagement of the cup or container to be filled with an arm 24 carried by the stem of the valve. While the valve is normally closed it may be opened by pressing the edge of the cup or other container upwardly against the arm 24.

Secured to one side of the container is a cup rack or holder 25 in which a supply of cups or other containers 26 may be carried. For the purpose of providing a compact construction the discharge spout or faucet 22 preferably extends outwardly from the beverage container immediately under the cup rack 25.

Located under the beverage container is a compartment or chamber 27 in which empty used cups or any other articles may be placed. This chamber may be conveniently formed by extending the wall of the outer chamber 12 downwardly below the bottom of the beverage container, this extended wall being indicated herein by the reference character 28. The wall 28 is connected by a wall 29 which forms the bottom of chamber 27 and the wall 28 may be provided with one or more openings 30 through which the cups or other articles may be introduced into the chamber 27.

In practice closure cap 15 is removed and the beverage container is filled with the desired amount of beverage. Thereafter the closure cap is immediately replaced and inasmuch as the chamber is substantially air tight and heat insulated the gas in the beverage is not permitted to escape and the beverage is furthermore miantained at the proper temperature. The person dispensing the beverage may then carry the container to the customers and serve the same by means of the cups 26. When a cup of beverage is being drawn, valve 19 is opened to permit air to pass into the upper end of the beverage chamber to offset the vacuum caused by withdrawing the beverage.

While an embodiment of the invention has been illustrated and described herein somewhat in detail it will be readily apparent to those skilled in this art that various changes in the specific structure illustrated may be resorted to without departing from the spirit and scope of this invention and to this end reservation is made to make such changes as may come within the purview of the accompanying claims.

What I claim as my invention:—

1. A portable dispensing apparatus for carbonated beverages comprising, a heat insulated air-tight container provided with a filling opening in the top thereof, a closure cap for said opening, a handle secured to said closure cap, a valve controlled air inlet formed in said closure cap, a cup rack secured to the side wall of said container, a beverage discharge spout communicating with the lower end of said container and extending under said cup rack, the walls of said container being extended below the bottom of said container to form a compartment for used cups, as and for the purpose set forth.

2. A portable dispensing apparatus for beverages and the like comprising, a heat insulated container provided with a filling opening, a closure cap for said opening, a handle for said container secured to said closure cap, a normally closed spring influenced valve controlling an air inlet for said container arranged adjacent said handle, a vertically extending rack secured to the side of the wall of said container and receiving a plurality of cups, a beverage discharge spout communicating with the lower end of the container and extending under said cup rack, and a compartment under said container for receiving used cups.

In testimony whereof I affix my signature

WILLIAM E. DOUGHTY.